(12) United States Patent
Voigt et al.

(10) Patent No.: US 12,504,614 B2
(45) Date of Patent: Dec. 23, 2025

(54) MULTI-IMMERSION MICROSCOPE OBJECTIVE WITH MINIMALLY REFRACTIVE SURFACES

(71) Applicant: UNIVERSITÄT ZÜRICH, Zürich (CH)

(72) Inventors: Fabian Friedrich Voigt, Zürich (CH); Fritjof Helmchen, Zürich (CH)

(*) Notice: Subject to any disclaimer, the term of this patent is extended or adjusted under 35 U.S.C. 154(b) by 522 days.

(21) Appl. No.: 17/995,709

(22) PCT Filed: Apr. 12, 2021

(86) PCT No.: PCT/EP2021/059448
§ 371 (c)(1),
(2) Date: Oct. 7, 2022

(87) PCT Pub. No.: WO2021/205038
PCT Pub. Date: Oct. 14, 2021

(65) Prior Publication Data
US 2023/0139165 A1    May 4, 2023

(30) Foreign Application Priority Data
Apr. 10, 2020 (EP) ..................... 20169190

(51) Int. Cl.
G02B 21/33 (2006.01)
G01N 21/64 (2006.01)
G02B 21/04 (2006.01)

(52) U.S. Cl.
CPC ......... G02B 21/33 (2013.01); G01N 21/6458 (2013.01); G02B 21/04 (2013.01)

(58) Field of Classification Search
CPC ..... G02B 21/33; G02B 21/04; G01N 21/6458
USPC ........................................... 359/656
See application file for complete search history.

(56) References Cited

U.S. PATENT DOCUMENTS

| 3,364,816 | A | 1/1968 | Jeffree |
|---|---|---|---|
| 2001/0028497 | A1 | 10/2001 | Uhl |
| 2005/0152027 | A1 | 7/2005 | Armstrong |
| 2014/0022524 | A1 | 1/2014 | Wegmann |
| 2020/0103638 | A1 | 4/2020 | Pellin |

FOREIGN PATENT DOCUMENTS

| CN | 1761903 | 4/2006 |
|---|---|---|
| CN | 114719976 | 7/2022 |
| EP | 3206010 | 8/2017 |
| EP | 3511757 | 7/2019 |

*Primary Examiner* — William Choi
(74) *Attorney, Agent, or Firm* — JMB DAVIS BEN-DAVID

(57) ABSTRACT

The present invention relates to an immersion microscope objective (10) for inspecting a sample (S) in an immersion medium (M), comprising: at least one concave minor (3), at least one optical element (1) comprising an aspherical surface (2) facing the at least one concave minor (3), and an internal space (4) arranged between the at least one concave minor (3) and said aspherical surface (2), said internal space (4) being configured to be filled with an immersion medium (M) such that the immersion medium (M) contacts the at least one concave minor (3) and the aspherical surface (2). According to the present invention, the aspherical interface (2) is shaped such that the working distance (7) of the immersion microscope objective (10) varies by less than 1% when the refractive index n of said immersion medium (M) is increased or decreased by at least 0.025.

17 Claims, 13 Drawing Sheets

| Clearing method | n | Comment | Reference |
|---|---|---|---|
| ExM | 1.33 | Magnification by tissue expansion | Chen et al. 2015 |
| Scale | 1.38 | Urea-based clearing | Hama et al. 2011 |
| CLARITY | 1.45 | Hydrogel fixation & electrophoretic clearing | Chung et al. 2013 |
| CUBIC | 1.49 | Aminoalcohol-based | Tainaka et al. 2014 |
| 3DISCO | 1.56 | Dibenzyl-ether-based (DBE) | Ertürk et al. 2012 |
| uDISCO | 1.56 | Benzyl alcohol / Benzyl benzoate (BABB) | Pan et al. 2016 |

MULTI-IMMERSION MICROSCOPE OBJECTIVE WITH MINIMALLY REFRACTIVE SURFACES

CROSS-REFERENCE TO RELATED APPLICATIONS

This is the U.S. National Stage of International Patent Application No. PCT/EP2021/059448 filed on Apr. 12, 2021, which in turn claims the benefit of European Patent Application No. 20169190.4 filed on Apr. 10, 2020.

The present invention relates to an immersion microscope objective for inspecting a sample in an immersion medium as well as to a microscope comprising such an objective.

In a microscope such as a laser scanning microscope, a sample is interrogated with a light beam that is directed to various parts of the sample in succession while an optical signal of the sample response is acquired with a light detector and a data acquisition system [1]. The signal created by the sample can be due to reflectance, scattering, polarization, single- or multi-photon excited fluorescence, and other physical processes such as harmonic generation and Raman scattering. To create an image of the whole sample, the light beam or sample is raster scanned across a region of interest by either translating the sample (stage scanning) or translating the light beam by an optical scan system. Such a scan system can utilize galvanometric scan mirrors, acousto-optic deflectors, polygon scanners, and other optical elements. The beam deflection introduced by the scan system is steered by a control system linked to the data acquisition system. Often, an intermediate optical system (for example, a scan lens and a tube lens) is utilized to transfer the scanned light beam to a microscope objective which focuses the beam onto the sample (cf. FIG. 1).

Apart from raster scanning, other scan patterns can be adopted to interrogate the sample (for example line scanning, spiral scanning, and random-access scanning) which allow faster acquisition of biological, chemical, or physical events inside the sample as the number of points targeted during a scan cycle is reduced which in turn allows a higher repetition frequency of the scan pattern. Many laser scanning microscopes also offer the possibility of utilizing a light beam to optically stimulate or modify the sample or subregions thereof, for example by laser microsurgery, optical trapping, optogenetics, uncaging, photobleaching, or fluorescence recovery after photobleaching (FRAP) [1]. Many laser scanning microscopes utilize techniques to generate optical sectioned images, i.e. are capable of producing datasets that look equivalent to mechanically sectioned samples imaged with the same modality. Optical sectioning is achieved by reducing the background signal from parts of the sample away from the focal region of the microscope objective. This reduction can be realized using optical means, for example by rejecting light from out-of-focus regions using a confocal pinhole in a confocal microscope [1] or by illuminating the sample such that little or no signal outside of the focal region of the microscope objective is generated, for example using side-illumination in a light-sheet microscope. Optical sectioning can also be achieved by computational processing of the acquired data using methods such as deconvolution. In addition, optically sectioned images can be generated by utilizing non-linear light-matter interactions such as multiphoton microscopy methods, for example two-, three-, four-photon microscopy, second- and third-harmonic generation, Coherent anti-Stokes Raman Scattering (CARS), and stimulated Raman scattering (SRS). In these methods, multiple photons need to interact with a molecule inside the sample and thus the generated signal depends nonlinearly on illumination intensity, with higher powers than unity. For example, the two-photon signal depends on the square of the illumination intensity. As the illumination intensity falls off drastically outside of the focal region of the illumination beam, the effective excitation volume in multiphoton processes is spatially restricted in three dimensions around this focal region which generates an optical sectioning effect. By using a pulsed pico- or femtosecond laser operating in the near infrared region of the spectrum (700-2500 nm), nonlinear excitation processes can be used to create fluorescence light that can be detected with a light detector (for example, a camera, photomultiplier, or photodiodes) operating in the visible region. In many multiphoton microscopy methods (for example, two- and three-photon microscopy), it is sufficient to detect the light generated inside the sample using the nonlinear process by a photodetector that collects as much light as possible from the sample (non-descanned detection).

A key challenge in the design of modern laser scanning microscopes is that there is a wide variety of immersion media that microscope optics need to be corrected for. This is of special importance when imaging samples processed with tissue clearing techniques [2]—methods which chemically render biological tissue transparent and thus accessible to visible light. Clearing techniques reduce scattering and homogenize the refractive index throughout the sample by removing tissue constituents such as lipids which act as scatterers. Currently, there is a wide variety of such clearing techniques such as Scale [3], 3DISCO [4], iDISCO [5], vDISCO [6], uDISCO [6], CLARITY [7], [8], and CUBIC [9] (cf. also FIG. 2). As the final step in each clearing protocol, the sample is placed in a liquid medium that equilibrates the refractive index by diffusion.

Depending on the used medium, the refractive indices can vary considerably. For example, the 3DISCO, vDISCO and uDISCO protocols utilize a BABB medium (a 50/50 vol/% mixture of benzylalcohol and benzylbenzoate) that leads to a final index of $n_d$=1.559 [10] whereas iDISCO utilizes dibenzylether with an index of $n_d$=1.562 [10]. Here, $n_d$ refers to the refractive index measured at the d-line of sodium at 587,562 nm. CLARITY, on the other hand, uses immersion fluids with lower index such as a refractive index matching solution with an index of 1.45 [8], [11]. In addition, there is another class of tissue processing techniques called expansion microscopy [12] which uses tissue swelling as a chemical magnification process and utilizes water as a final immersion medium. Water ($n_d$=1.333) is also commonly used as an embedding medium for in vivo microscopy of living cells and entire organisms such as developing embryos. For living samples, other immersion media such as silicon oil and gradient density media such as 2,2'-Thiodiethanol [13] have been proposed. 2,2'-Thiodiethanol has an index of 1.429 as a 60% stock solution that is commercially available under the brand name OptiPrep. Depending on the mixture ratio with water, the index can be tuned between $n_d$=1.333 to $n_d$=RI 1.429. Due to the significant differences in refractive index $n_d$ and dispersion (quantified by the Abbe number $V_d$,) the design of microscope objectives compatible with all these media is highly challenging. In addition, deep imaging at high resolution in living or cleared samples necessitates a high numerical aperture (NA) and long working distances to allow sufficient mechanical distance between the optical elements (such as the front lens of a refractive objective) and the sample itself. Both of these requirements further complicate the optical designs of microscope objectives for such applications.

For example, in U.S. Pat. No. 9,195,040 a series of refractive microscope objectives designed to operate in combination with an immersion medium with variable index in at least part of the 1.33-1.52 range with numerical apertures of NA 0.9-0.95 and working distances of up to 8 mm is disclosed.

Furthermore, U.S. Pat. No. 9,477,073 discloses immersion microscope objectives with working distances up to 10 mm and NA 1.0 for variable indices ranging from 1.4 to 1.52.

Further, U.S. Pat. No. 10,330,908 discloses a series of microscope objectives with NA 0.6 and working distances of 20 mm in media with a variable index of n=1.45 to 1.51.

However, all these designs require a large number of lens groups for sufficient correction of aberrations and require tight tolerances during manufacturing and assembly which renders such objectives very costly.

One approach to improve immersion microscope objectives is to use different design forms, for example purely reflective designs or catadioptric objectives using both refractive and reflective elements. This approach has a long tradition in optics: The thought that color aberrations caused by material dispersion were not correctable with the selection of glasses available at the time led Newton to design reflective telescopes as they do not suffer from chromatic aberrations. He also suggested to use a mirror for microscopy [14]. Today, pure reflective microscope objectives are common in NIR spectroscopy and UV semiconductor inspection microscopes, however, they are rarely used in biological microscopy.

Based on the above, the problem to be solved by the present invention is to provide a cost-effective microscope objective that is compatible with a wide range of indices and dispersive properties of liquid immersion media.

This problem is solved by an immersion microscope objective for inspecting a sample in an immersion medium, comprising:
at least one concave mirror,
at least one optical element comprising an aspherical surface facing the at least one concave mirror,
an internal space arranged between the at least one concave mirror and said aspherical surface, said internal space being configured to be filled with an immersion medium such that the immersion medium contacts the at least one concave mirror and the aspherical surface.

According to the present invention, the non-planar aspherical surface is shaped such that the working distance of the immersion microscope objective varies by less than 1% when instead of a first immersion medium being arranged in said internal space a second immersion medium resides in the internal space that comprises a refractive index n that is increased or decreased with respect to the refractive index of the first immersion medium by at least 0.025.

In other words, according to the present invention, the non-planar aspherical interface is shaped such that the working distance of the immersion microscope objective varies by less than 1% when the refractive index n of said immersion medium is increased or decreased by at least 0.025 (i.e. n±0.025). Particularly, the refractive index can be changed by exchanging the immersion medium in the internal space with another immersion medium or by altering the immersion medium present in the internal space (e.g. by varying its composition and/or by varying the temperature of the immersion medium).

According to a further alternative aspect of the present invention, the aspherical interface is shaped such that the immersion microscope objective retains a diffraction-limited image quality with a Strehl ratio being larger than 0.8 for at least one wavelength of light passing the aspherical surface when the refractive index n of said immersion medium at said wavelength is increased or decreased by at least 0.025.

According to a preferred embodiment of the present invention, the refractive index n of said first and/or second immersion medium is in the range from 1.0 to 1.6, particularly in the range from 1.3 to 1.6.

Furthermore, according to an embodiment of the immersion microscope objective, the numerical aperture NA of the immersion microscope objective is in the range from 0.3 to 1.0 in air.

According to yet another embodiment of the immersion microscope objective, the internal space of the immersion microscope objective is configured to be filled with an immersion medium which is one of: a fluid, a gas, a liquid, a gel (i.e. a nonfluid colloidal network or polymer network that is expanded throughout its whole volume by a fluid), a hydrogel (i.e. a gel in which the swelling agent is water). Furthermore, according to an embodiment, the immersion medium is comprised by the immersion microscope objective and is one of: a fluid, a gas, a liquid, a gel, a hydrogel.

Furthermore, according to an embodiment, the at least one mirror and the at least one optical element are rotationally symmetric with respect to an optical axis. Particularly, the vertex of the mirror corresponds to the intersection of the reflective surface of the at least one mirror and the optical axis.

According to a preferred embodiment of the immersion microscope objective, the at least one mirror comprises a spherical shape.

Furthermore, in an embodiment, said at least one mirror is one mirror of a plurality of mirrors comprised by the immersion microscope objective, wherein each mirror of said plurality of mirrors is configured to contact the immersion medium when the immersion medium resides in said internal space.

According to yet another embodiment, the immersion microscope objective comprises a further aspherical surface shaped to compensate a spherical aberration created by the at least one mirror.

In this regard, in an embodiment, the further aspherical surface is formed by said at least one optical element and faces away from said aspherical surface that faces the at least one mirror.

The optical system forming the basis of such an embodiment is known as a Schmidt telescope or Schmidt objective [15]. In this case, the further aspherical surface is commonly described by a polynomial up to 10th or higher order:

$$z(y)=a_1y^2+a_2y^4+a_3y^6+a_4y^8+a_5y^{10}$$

According to literature [16], for the correction of spherical aberration up to third order, said further aspherical surface can be prescribed as:

$$z(y) = -\frac{3y_0^2 y^2}{8(n-1)R^3} + \frac{y^4}{4(n-1)R^3}$$

Here, $y_0$ is the maximum radius of the correction surface, n is the refractive index of the correcting element and R is the radius of the at least one mirror. If correction of spherical aberration up to higher orders (such as $5^{th}$, $7^{th}$ and $9^{th}$ order)

is needed, the above polynomial needs to be extended with higher terms, the coefficients for which can be found numerically using optical design software. During such an optimization process, the off-axis image quality is typically balanced against on-axis performance and as a result, the coefficients $a_i$ for the aspherical surface tend to deviate from said prescription.

As a standard Schmidt objective operates in air, said at least one mirror and said at least one optical element are separated by an air gap. In a solid-Schmidt objective [16], this gap is filled with a solid medium of index n. The surface figure for said further aspherical surface for a solid-Schmidt corrected for spherical aberration up to third order can be described as [16]:

$$z(y) = -\frac{3ny_0^2 y^2}{8(n-1)R^3} + \frac{ny^4}{4(n-1)R^3}$$

This surface shape distorts the incoming parallel wavefront into a shape that counteracts the spherical aberration if the at least one mirror is spherical with radius R. In this case, according to an embodiment of the present invention, the above-mentioned aspherical surface facing the at least one concave mirror is preferably shaped as $$w(y) = -\frac{3y_0^2 y^2}{8R^3} + \frac{y^4}{4R^3}$$

to fulfil the previously mentioned condition that the working distance of the immersion microscope objective varies by less than 1% when instead of a first immersion medium being arranged in said internal space a second immersion medium resides in the internal space that comprises a refractive index that is increased or decreased with respect to the refractive index of the first immersion medium by at least 0.025. In the paraxial approximation, if a prescription in the form of a polynomial z(y) for the further aspherical surface has been found, the shape w(y) of said aspherical surface facing the at least one concave mirror is preferably given by:

$$w(y) = \frac{n-1}{n} z(y)$$

according to an embodiment of the present invention. Here, n is the refractive index of the correcting element. As a result, the shape of the aspherical surface facing the at least one concave mirror is a scaled version of the shape of the further aspherical surface. On its own, the aspherical surface facing the at least one concave mirror would not be sufficient to correct for the spherical aberration of the at least one concave mirror and thus does not represent the shape of a classical Schmidt corrector according to [15] & [16]. However, it does represent the exact shape of the wavefront inside the optical element facing the at least one mirror. If an optical surface forming an interface between two media is shaped similarly to an incoming wavefront, any ray passing such an interface does not undergo an angular deviation due to refraction as it passes at normal incidence. As no refraction occurs at this interface, it does not contribute any optical power to the objective and no additional aberrations (including defocus) are generated. As a result, the working distance of the immersion microscope objective varies by less than 1% when instead of a first immersion medium being arranged in said internal space a second immersion medium resides in the internal space that comprises a refractive index that is increased or decreased with respect to the refractive index of the first immersion medium by at least 0.025.

According to an alternative embodiment, the further aspherical surface is formed by a further optical element of the immersion microscope objective.

Particularly, in an embodiment, the immersion microscope objective comprises a lens group comprising a plurality of lenses, wherein the first optical element forms a lens of said lens group, and/or wherein the further optical element forms a lens of said lens group.

According to a further preferred embodiment, the immersion microscope objective comprises a sample holder configured to hold a sample such that the sample is located in said internal space between the at least one mirror and said aspherical surface facing the at least one mirror.

A further aspect of the present invention relates to a microscope comprising an immersion microscope objective according to the present invention.

According to a preferred embodiment of the microscope, the microscope is one of:
 a wide-field microscope, particularly comprising a single- or a multi-element tube lens,
 a light-sheet microscope, particularly comprising a single- or a multi-element tube lens,
 a two-photon fluorescence microscope,
 a three-photon fluorescence microscope,
 a four-photon fluorescence microscopy,
 a second-harmonic generation microscope,
 a third-harmonic generation microscope,
 a fluorescence confocal microscope,
 a reflectance confocal microscope,
 a polarization microscope,
 a Coherent Anti-Stokes Raman Scattering (CARS) microscope,
 a stimulated Raman Scattering (SRS) microscope.

In the following, embodiments of the present invention as well as further features and advantages are described with reference to the Figures, wherein FIG. 1 shows a general layout of a laser scanning microscope as known in the prior art FIG. 2 shows a table containing an overview of common clearing methods and immersion media FIG. 3 shows an arbitrarily shaped wavefront W encountering an interface between two different media which is sufficiently similar to the wavefront itself such that the wavefront W' continues its propagation in an undeviated manner in the second medium, wherein for each location along the wavefront, the normal vector of the interface is perpendicular to the wavefront, therefore no refraction occurs and the surface is minimally refractive (LEFT). Further, FIG. 3 shows the general concept of an immersion microscope objective according to the present invention using a concave mirror (RIGHT);

Figures 1, 2:
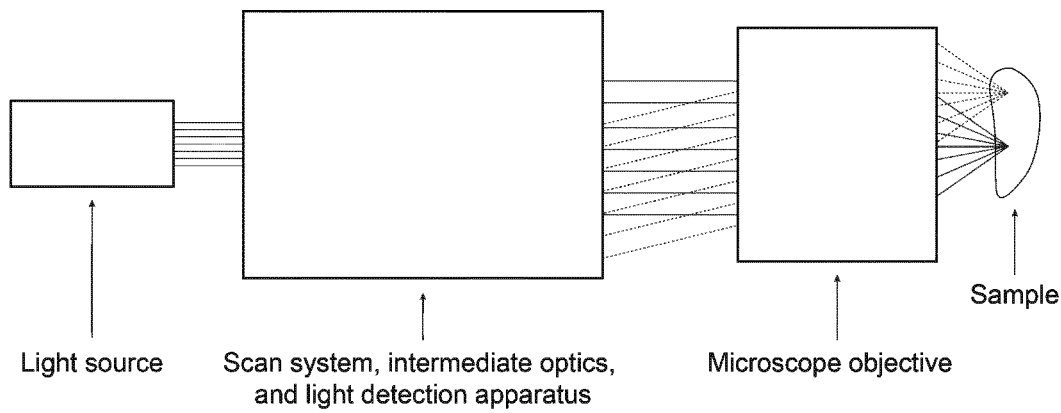
Figure 3:
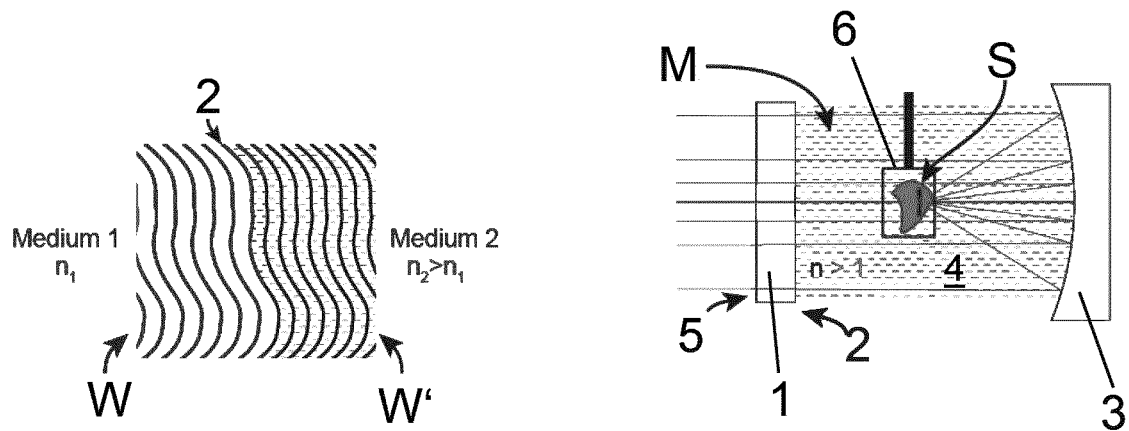
Figure 4:
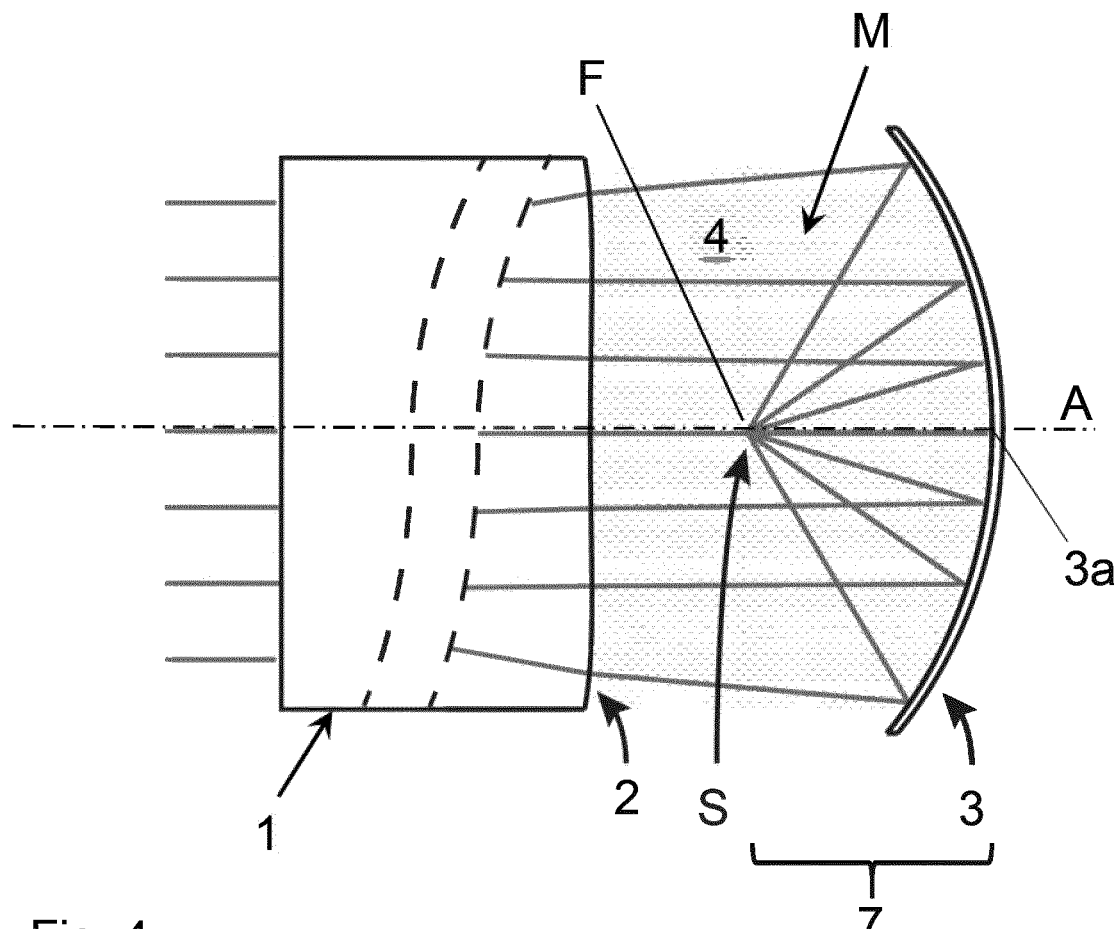
FIG. 4 shows an embodiment of a multi-immersion microscope objective according to the present invention with minimally refractive surfaces

The present invention relates to an immersion microscope objective 10 that can be used with a variety of different immersion media M. Particularly, as shown in FIG. 3 on the right hand side and in FIG. 4 showing a general embodiment of the objective 10 according to the present invention, such an objective 10 comprises at least one concave mirror 3 having a working distance 7 being the distance between the focus F of the microscope objective 10 and the vertex $3a$ of the concave mirror 3, at least one optical element 1 comprising an aspherical surface 2 facing the at least one concave mirror 3, and an internal space 4 arranged between the at least one concave mirror 3 and said aspherical surface 2, said internal space 4 being configured to be filled with an immersion medium M such that the immersion medium M contacts the at least one concave mirror 3 and the aspherical surface 2, wherein the aspherical interface is shaped such that the working distance of the immersion microscope objective 10 varies by less than 1% when the refractive index n of said immersion medium is increased or decreased by at least 0.025 (e.g. due to exchanging the immersion medium M with another one).

The preferably high-order aspherical surface 2 can be formed by a transparent correction plate 1. In addition, such a correction plate 1 can have a further aspherical surface 5 adapted to counteract the spherical aberration of the at least one mirror 3 to deliver excellent image quality.

As described above, if a prescription in the form of a polynomial $z_5(y)$ for the further aspherical surface 5 has been found for the paraxial case (e.g. by numerical optimization in an optical design program), the shape $z_2(y)$ of the high-order aspherical surface 2 is preferably chosen according to:

$$z_2(y) = \frac{n-1}{n} z_5(y)$$

if n is the refractive index of the material of the correction plate 1. Thus, the shape of the high-order aspherical surface 2 is a scaled version of the shape of the further aspherical surface 5. On its own, the aspherical surface 2 facing the at least one concave mirror would not be sufficient to correct for the spherical aberration of the at least one concave mirror and thus does not represent the shape of a classical Schmidt corrector according to [15] & [16].

If the medium M between the correction plate 1 and the mirror 3 is replaced with a solid with index n, the numerical aperture (NA=n sin α) is increased by a factor of n which in turn improves the resolving power of the microscope. In addition, the image brightness scales as $n^2$. If the space between the correction plate 1 and the mirror 3 is not filled with a solid material, but a liquid immersion medium M, the system acts as an immersion objective 10.

Advantageously, in such a design, the mirror 3 does not introduce varying aberrations (especially chromatic aberrations) when the immersion medium M (e.g. fluid) is exchanged to one with different refractive index and dispersion. The reason is that the law of reflection at an interface ($\theta_1 = \theta_2$) does not contain any dependence on the wavelength-dependent refractive index of the medium ($\lambda$) as in Snell's law for refraction at an interface between two media $n_1 \sin \theta_1 = n_2 \sin \theta_2$. This design concept can be used to turn any mirror-based telescope or microscope design (such as a Schwarzschild two-mirror objective) into an immersion objective 10. As, however, part of the excitation optics (if used in combination with laser scanning) or the detection path (if used in combination with an eyepiece or a camera) is usually placed in air, there has to be a window separating the immersed section of the microscope and the other sections of the optical path. When rays starting at or directed to off-axis locations of the rotationally symmetric optical system hit this surface, lateral chromatic aberration is generated which is the dominant chromatic aberration in such immersed mirror systems.

In general, the aspherical correction plate 1 deforms the parallel wavefront outside of the objective in a way to counteract the spherical aberration of the primary mirror. As stated above, the reflection of a wavefront off a mirror is independent of the medium the wavefront is propagating in. This means that for any possible immersion medium M inside the objective 10, a single shape of the aspherical correction plate 1 is sufficient to correct the spherical aberration of the mirror 3 as long as no additional refraction (equivalent to additional wavefront distortions) happens when the wavefront crosses the interface (e.g. aspherical surface 2) between the correction plate 1 (preferably made of a transparent solid material such as a glass or a plastic) and the (e.g. liquid) immersion medium M. This can be achieved if the surface 2 separating the correction element 1 and the liquid medium M is shaped similarly as the passing wavefront. In this case, there is no additional refraction of rays (as locally, the wavefront crosses the interface with a surface normal perpendicular to the wavefront) and no additional aberrations are generated—the surface is minimally refractive. If wavefronts are originating from or directed at off-axis locations, there will be slight deviation from local normal incidence and thus, additional off-axis aberrations can be generated. However, for sufficiently small angle differences (<11.4° or 0.2 radians), the resulting aberrations are small. Therefore, we define a surface as minimally refractive if the absolute difference of the angle of incidence $\theta_1$ and the angle of refraction $\theta_2$ at the intersection point between any ray contributing to image formation and the surface (and thus subject to Snell's law according to $n_1 \sin \theta_1 = n_2 \sin \theta_2$) is less than 0.2 radians:

$|\theta_1 - \theta_2| < 0.2$ radians

Minimally refractive surfaces (here e.g. the aspherical surface 2) can thus be used to transfer wavefronts (cf. wavefronts W, W' in FIG. 3) between media without generating aberrations which is a highly useful general optical design principle to design immersion objectives for a wide range of media. It can be seen as a generalization of the aplanatic-concentric surface well known in optical design: If the desired wavefront should be spherical, the necessary minimally refractive surface is concentric around the focus—a design approach that is often used for high-NA collimators, microscope objectives, and interferometry objectives for optical metrology. Beyond the rotationally-symmetric aspherical surfaces utilized here, minimally refractive free-form surfaces can be imagined to be useful in off-axis variants of the optical systems presented here.

As already introduced above, FIG. 4 illustrates a fundamental embodiment/design concept of the multi-immersion microscope objective 10 according to the present invention. In its general form, the disclosed microscope objective 10 comprises a concave mirror 3 in contact with an immersion medium M and a group of one or more optical elements 1 that has an element of which a surface forms said aspherical surface 2 that separates the immersion medium M/internal space 4 of the objective 10 and said group. According to an example, said group of optical elements can be formed by the correction plate 1 described earlier or can comprise (among other optical elements) such a correction plate.

As shown in FIGS. 3 and 4 for instance, the sample S is immersed in the immersion medium M. The front group (e.g. optical element) 1 reshapes the wavefront entering or exiting the objective 10, for example to compensate aberrations introduced by the concave mirror 3. The aspherical surface 2 forming the boundary between a solid medium or optical element in group 1 and a liquid immersion medium M is preferably shaped as a minimally refractive surface (see above). The mirror 3 can be replaced by a combination of mirrors, at least one of which should be concave, all in contact with the immersion medium M, for example to fold the beam path for accessibility.

As a demonstration of this design principle according to the invention, the invention is applied to the design of multiphoton microscope objective. While in a confocal laser-scanning fluorescence microscope, sufficient correction of lateral and chromatic aberration over a wavelength band covering the necessary excitation and emission regions of the spectrum is beneficial to achieve a sufficiently large field of view (FOV), in a multiphoton microscope such as a two-photon microscope, the requirements for color correction are reduced. For example, in a two-photon microscope operating at an excitation wavelength of 850 nm and utilizing 100 fs laser pulses, the full-width-at-half-maximum (FWHM) width of the excitation spectrum is <10 nm. As a two-photon microscope can be operated in combination with descanned detection by collecting the bulk scattered and unscattered emission light with a photodetector, color correction is not necessary for the emitted fluorescence light. This means that correction of the lateral chromatic aberration over the visible and near-infrared domain of the spectrum is not required unless multiple excitation wavelengths should be employed at the same time. In addition, image curvature is of no concern in an extended (or even cleared sample), as the collected three-dimensional imaging data can be computationally morphed back into a Cartesian coordinate system.

Figure 5:
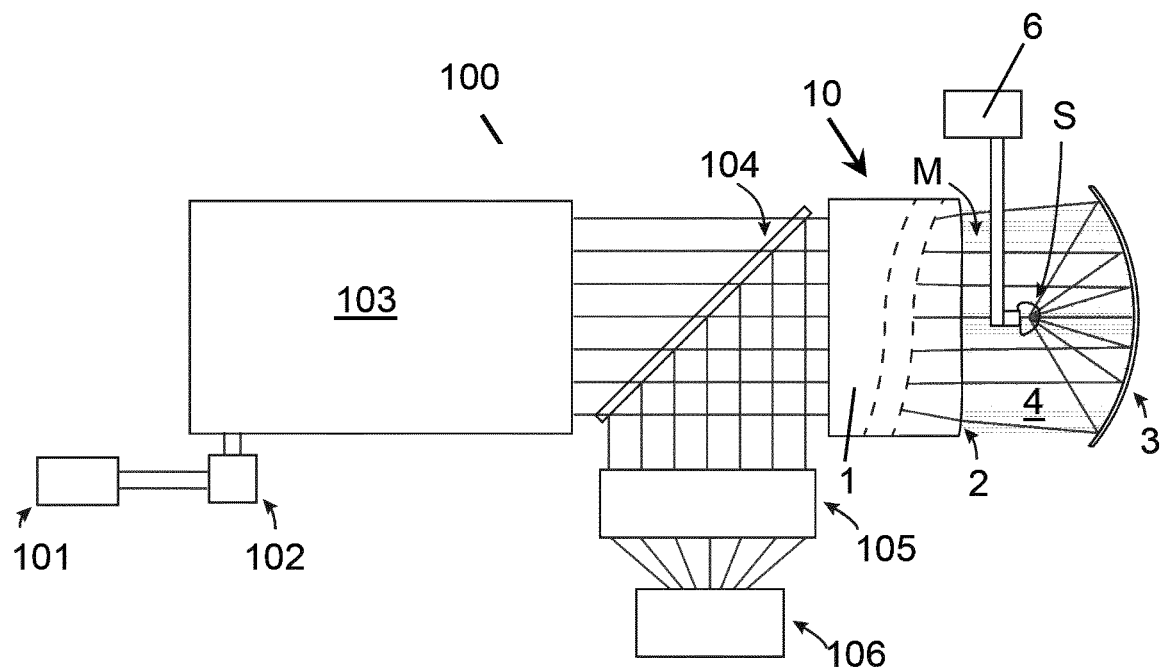
FIG. 5 shows an embodiment of a multi-immersion microscope objective according to the present invention in combination with a multiphoton microscope.

FIG. 5 shows an embodiment of a microscope 100 according to the present invention in form of a multiphoton microscope that comprises a multi-immersion microscope objective 10 according the present invention. In this setup, light from a light source 101 (for example a pico- or femtosecond laser source operating at a wavelength in the 700-2000 nm region or a combination of multiple such sources) is directed to a beam shaping device 102 that can include functions such as beam expansion, beam intensity control, beam stabilization and then directed to a scan system 103. This system 103 can contain a device to split the beam into beamlets and allows for controllable beam steering. The scanned beam is then directed to the aforementioned microscope objective 10 according to the present invention that is filled with an immersion medium M. A sample S is immersed in the medium M (in the internal space 4 of the objective 10) by a sample holder 6 and can be translated and, if necessary, rotated using a sample positioning device. The emitted light from the sample S is collected by the microscope objective 10 and separated from the excitation light using an emission dichroic 104. It is then directed to a collection optics 105 that concentrates the emitted light on a light detector 106. Sample positioning, beam scanning and light detection are preferably controlled electronically.

Figure 6:
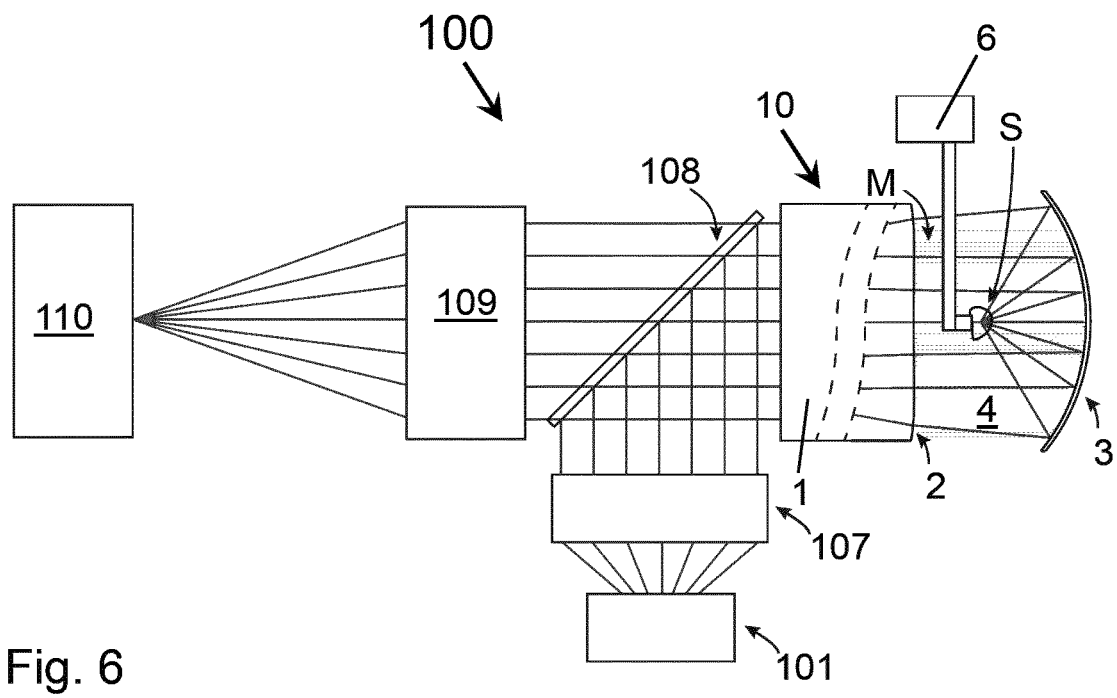
FIG. 6 shows an embodiment of a multi-immersion microscope objective in combination with a wide-field microscope.

FIG. 6 shows a further embodiment of a microscope 100 according to the present invention, here in form of a wide-field microscope, comprising a multi-immersion microscope objective 10 according to the present invention with minimally refractive surfaces. Light from a light source 101 such as a laser, light emitting diode, or fluorescent lamp is directed to a beam shaping illumination optics component 107 which can be used for intensity control, beam expansion, beam shaping, or beam scanning and redirects the excitation light towards a beam splitter 108, for example a dichroic mirror. The excitation light is then redirected towards the microscope objective 10 which directs the excitation light onto a sample S. The sample S is immersed in the immersion medium M by a sample holder 6 and can be translated and, if necessary, rotated using a sample positioning device. The emitted light from the sample S is collected by the immersion microscope objective 10 and directed to a tube optics module 109 which can contain optical filters to modify the spectrum of the detected light and focuses the light onto a camera module 110.

Figure 7:
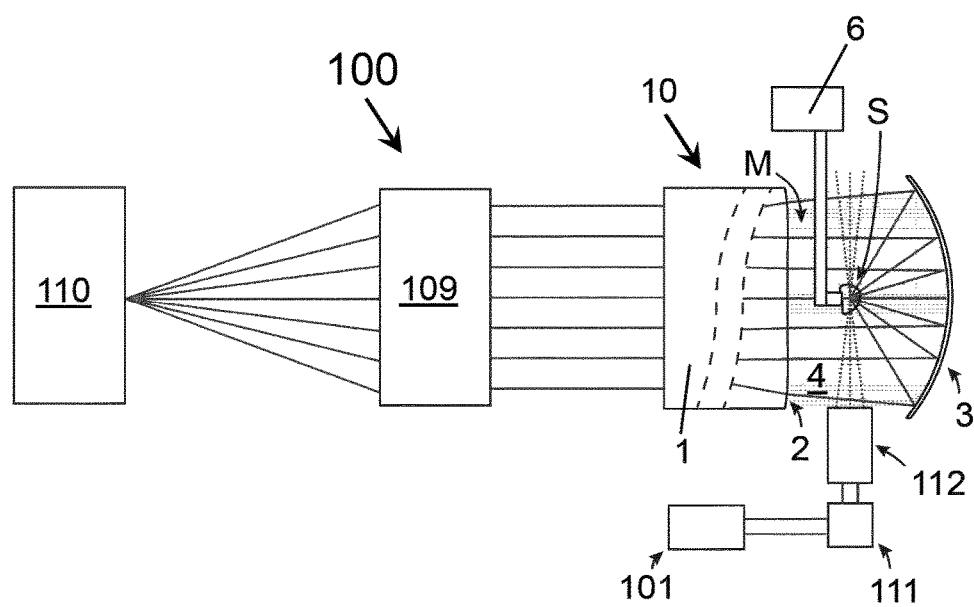
FIG. 7 shows an embodiment of a multi-immersion microscope objective in combination with a light-sheet microscope.

According to yet another embodiment of the microscope 100 according to the present invention, FIG. 7 depicts a light-sheet microscope 100 comprising an immersion microscope objective 10 according to the present invention. Here, light from a light source 101 such as a laser is directed to a beam shaping optics component 111 which can be used for intensity control, beam expansion, beam shaping, or beam scanning and redirects the excitation light towards an excitation optics component 112. After exciting the excitation optics module 112, the beam is shaped to resemble a light-sheet either by scanning the beam in time or by reshaping the beam profile into a light-sheet. The excitation optics 112 also forms an interface between the immersion medium M and external components and can include a device to seal the immersion medium M against the surrounding medium. The sample S is immersed in the medium M in the internal space 4 by a sample holder 6 and can be translated and, if necessary, rotated using a sample positioning device. The emitted light from the sample S is collected by the microscope objective 10 and directed to a tube optics module 109 which can contain optical filters to modify the spectrum of the detected light and focuses the light onto a camera module 110. To generate multiple light-sheets, the beam shaping optics component 111 can contain one or more beam-splitting devices which direct the excitation light to several excitation optics modules. This can be used to allow for multi-directional illumination of the sample S, for example to reduce shadowing artifacts caused by refracting or absorbing sample features.

Figure 8:
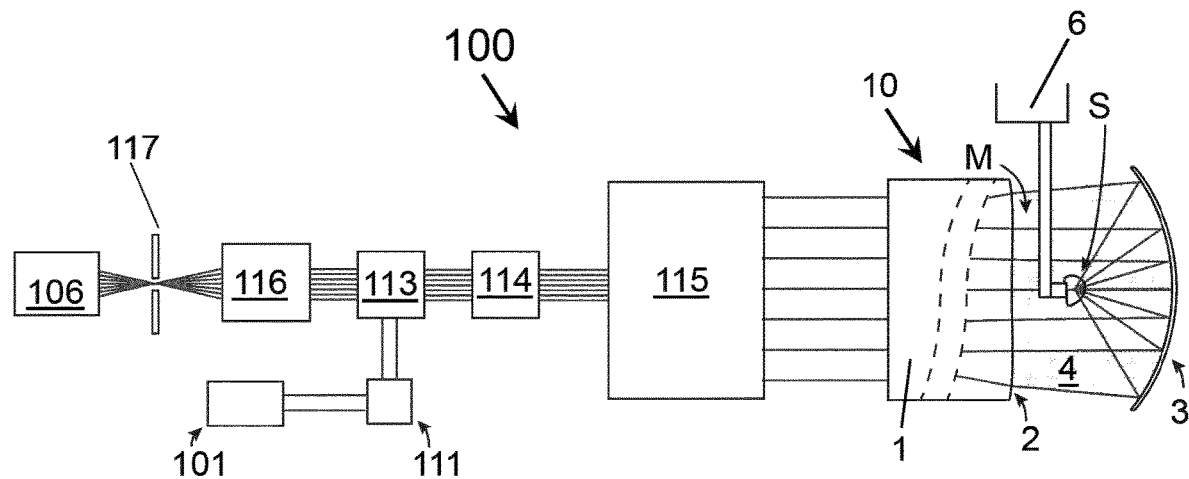
FIG. 8 shows an embodiment of a multi-immersion microscope objective in combination with a confocal microscope.

Furthermore, FIG. 8 shows an embodiment of a microscope 100 according to the present invention in form of a confocal microscope that comprises an immersion microscope objective 10 according to the present invention. Particularly, in the configuration shown in FIG. 8, light from a light source 101 (for example a continuous wave laser source operating at a wavelength in the visible region of the spectrum or a combination of multiple such sources) is directed to a beam shaping device 111 that can include functions such as beam expansion, beam intensity control, beam stabilization and then directed to beam splitting device 113, for example a dichroic beam splitter. The excitation light is then fed into a scan system 114. This system 114 can contain a device to split the beam into beamlets as for example in a spinning disk confocal microscope and allows for controllable beam steering. The scanned beam is then directed to the aforementioned microscope objective 10 via an intermediate optics module 115. The intermediate optics module 115 can also be designed to reduce chromatic aberrations generated by the multi-immersion microscope objective. The objective 10 is filled with an immersion medium M. A sample is immersed in the medium M by a sample holder 6 and can be translated and, if necessary, rotated using a sample positioning device. The emitted light from the sample S is collected by the microscope objective 10 and redirected through the optical path. The beam splitting device 113 is designed to transmit at least part of the light reflected, scattered, or emitted by the sample S and can utilize a dichroic beam splitter. A collection optics module 116 then focuses the light onto a confocal pinhole 117 which is adjustable in size. A light detector 106 then detects the light passing through the pinhole 117. Sample positioning, beam scanning and light detection are preferably controlled electronically. In variants of this microscope concept, especially in a spinning disk confocal microscope, the scan system 114 also contains an array of confocal pinholes.

Particularly, an optical system in the framework of the present invention can be considered to be diffraction-limited if the Strehl ratio (the ratio of the peak intensity of the point spread function of the optical system to the maximum intensity using an ideal point spread function) is larger than 0.8. This is equivalent to a root-mean-square (RMS) wavefront error lower than approximately $1/14\ \lambda = 0.0714\lambda$.

Furthermore, according to a preferred embodiment of the present invention, the aspheric surface that faces the concave mirror and contacts the immersion medium of the objective and/or delimits the internal space of the objective that particularly contains the sample is a rotationally symmetric polynomial aspherical surface described by a polynomial expansion of the deviation z from a spherical surface with radius r in terms of the radial coordinate y:

$$z(y) = a_1 y^2 + a_2 y^4 + a_3 y^6 + a_4 y^8 + a_5 y^{10}$$

To demonstrate the utility of optical design with minimally refractive surfaces, two further embodiments of the immersion microscope objective will be described below in more detail with reference to FIGS. 9 to 12D. These objectives are medium to high-NA multi-immersion microscope objectives and are particularly designed to provide diffraction-limited performance over FOVs of up to 2.8 mm and NAs of 0.5 and 0.85 in air. If these objectives are filled with a liquid immersion medium with index n, the focus location and working distance does not change (as no additional refraction is introduced by the surfaces surrounding the medium) and the numerical aperture increases by a factor of n. In a liquid medium with $n_d = 1.55$, the NAs reach 0.8 and 1.33, respectively. At constant pupil diameter, these designs have constant etendue (or a constant Lagrange invariant) with varying immersion media. This means that an increase in numerical aperture NA caused by filling the objective with a medium with index n coincides with a reduction in FOV size by a factor of 1/n. If the medium filling the objective space is not homogenous, the induced local wavefront distortions will degrade the optical performance.

Particularly, FIG. 9 and FIGS. 10A to 10D show an embodiment of a multi-immersion microscope objective according to the present invention.

In a material with $n_d = 1$ such as air, this embodiment has a numerical aperture (NA) of 0.52, in a material with $n_d = 1.333$ (such as water), the design has an NA of 0.69. In a higher index medium, for example with $n_d = 1{,}5579$, the system has an NA of 0.80.

It can operate as a two-photon microscope objective with excitation wavelengths ranging from 800 to 1000 nm and offers sufficient color correction to operate with 20 nm wide wavelength bands. The immersion medium fills the space between surface 2 and the mirror 3. The location of the image is stable in combination with different immersion media ranging from air, fluid, and solid media with variable $n_d$ and $V_d$.

Figure 9:
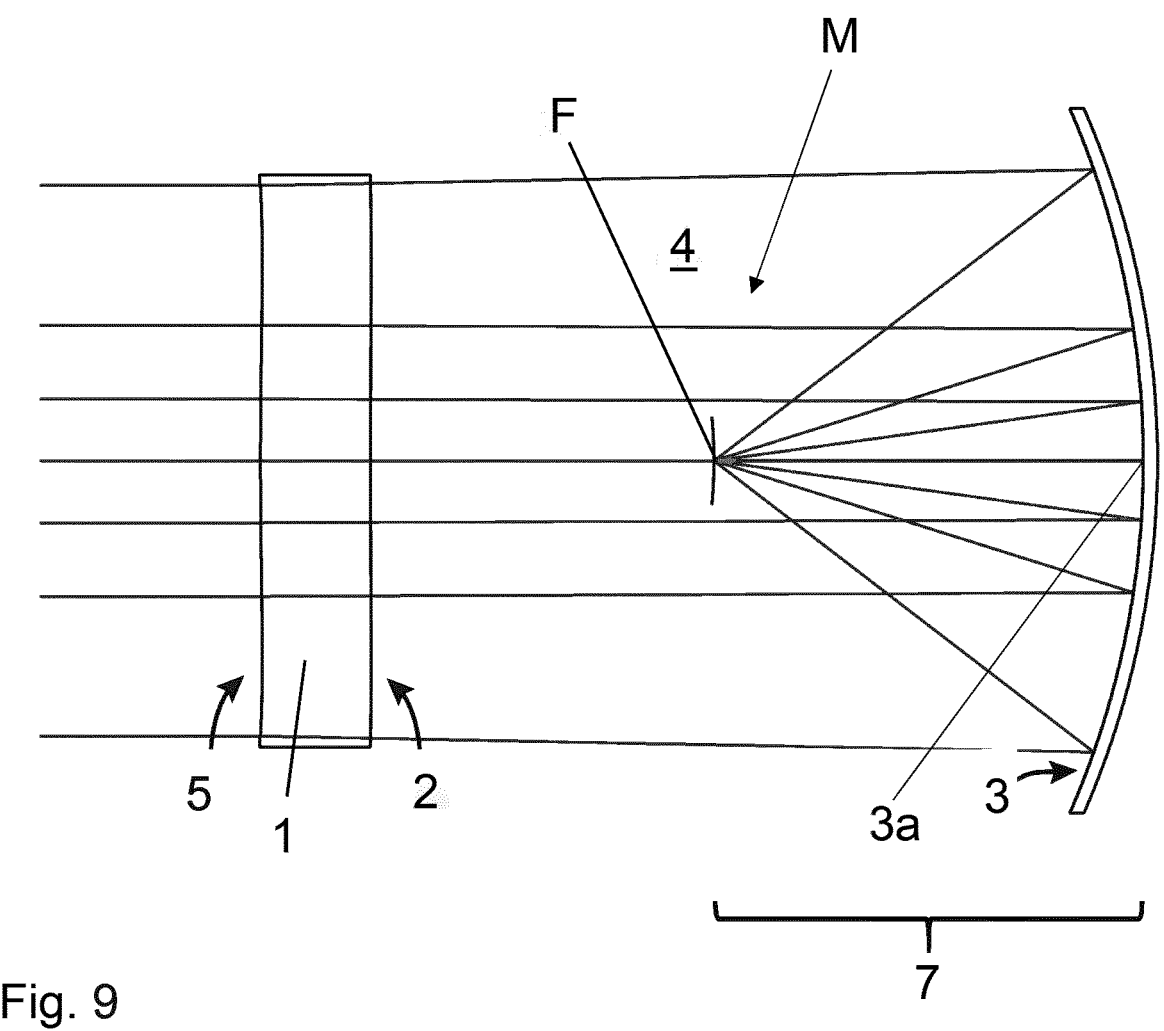
FIG. 9 shows a cross-sectional view of an embodiment of a multi-immersion microscope objective.
Figure 10A:
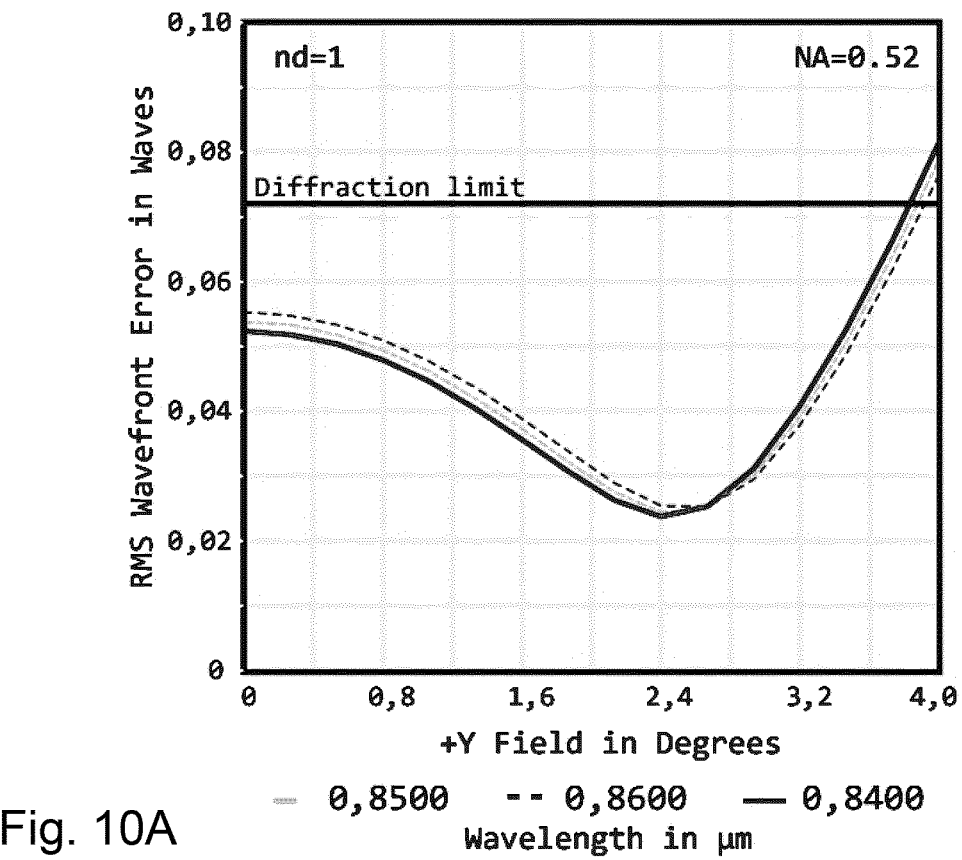
FIGS. 10A-10D show RMS wavefront diagrams for different immersion media and wavelengths for the embodiment shown in FIG. 9.
Figure 10B:
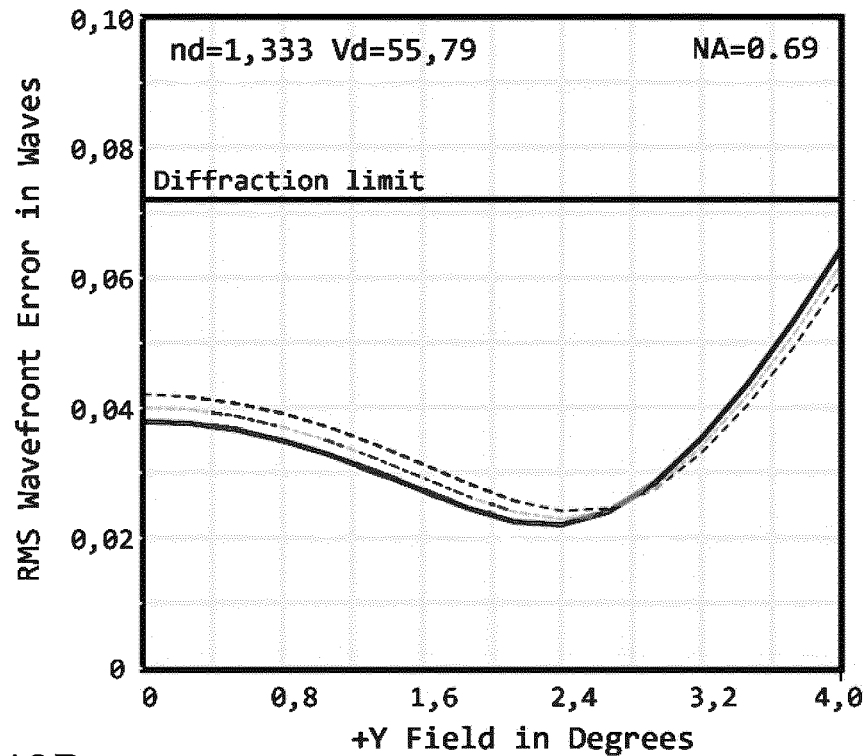
Figure 10C:
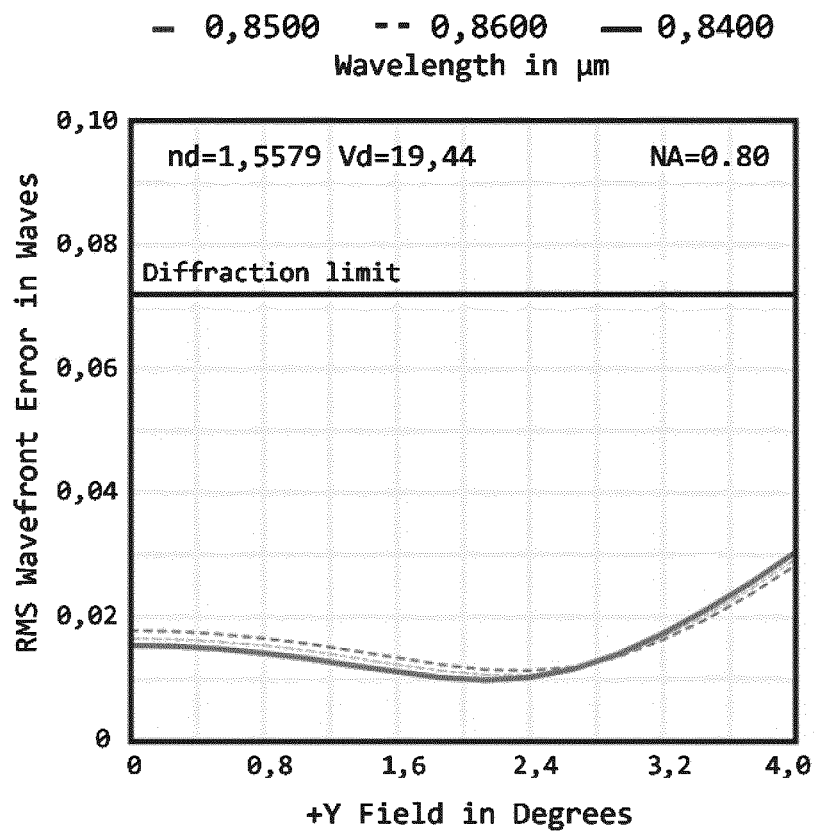
Figure 10D:
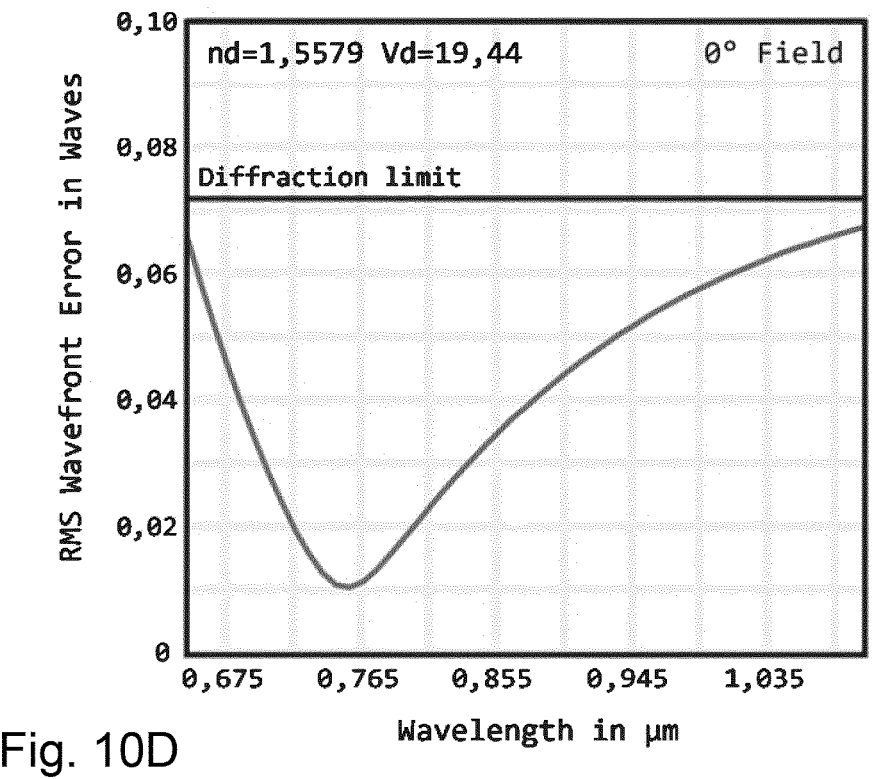

Exemplary parameters that are used in the embodiment according to FIGS. 9 and 10 are stated in the two tables below:

| Surface no. | Surface according to FIG. 9 | Radius (mm) | Thickness (mm) | $n_d$ | $V_d$ |
|---|---|---|---|---|---|
| 1 | 5 | 468.366 | 5 | 1.4584 | 67.82 |
| 2 | 2 | 1600.594 | 35.058 | Variable | Variable |
| 3 | 3 | −40 | −19.476 | Mirror | Mirror |
| Image | Image | −19.761 | | | |

| Surface no. | Surface according to FIG. 9 | a1 | a2 | a3 | a4 | a5 |
|---|---|---|---|---|---|---|
| 1 | 5 | 9.744E−04 | −1.124E−05 | −1.083E−08 | −5.473E−12 | −3.876E−14 |
| 2 | 2 | 3.279E−04 | −3.486E−06 | −4.951E−09 | 1.350E−11 | −4.465E−14 |
| 3 | 3 | | | | | |
| Image | Image | | | | | |

A further embodiment of the immersion microscope objective according to the present invention is shown in FIGS. 11 and 12A to 12D.

In a material with $n_d = 1$ such as air, this embodiment has a NA of 0.85, in a material with $n_d = 1.333$ (such as water), the design has an NA of 1.14. In a higher index medium, for example with $n_d = 1.5579$, the system has an NA of 1.33.

It can operate as a two-photon microscope objective with excitation wavelengths ranging from 780 to 940 nm and offers sufficient color correction to operate with 20 nm wide wavelength bands. The immersion medium fills the space between surface 2 and the mirror 3. The location of the image is stable in combination with different immersion media ranging from air, fluid, and solid media with variable $n_d$ and $V_d$.

Figure 11:
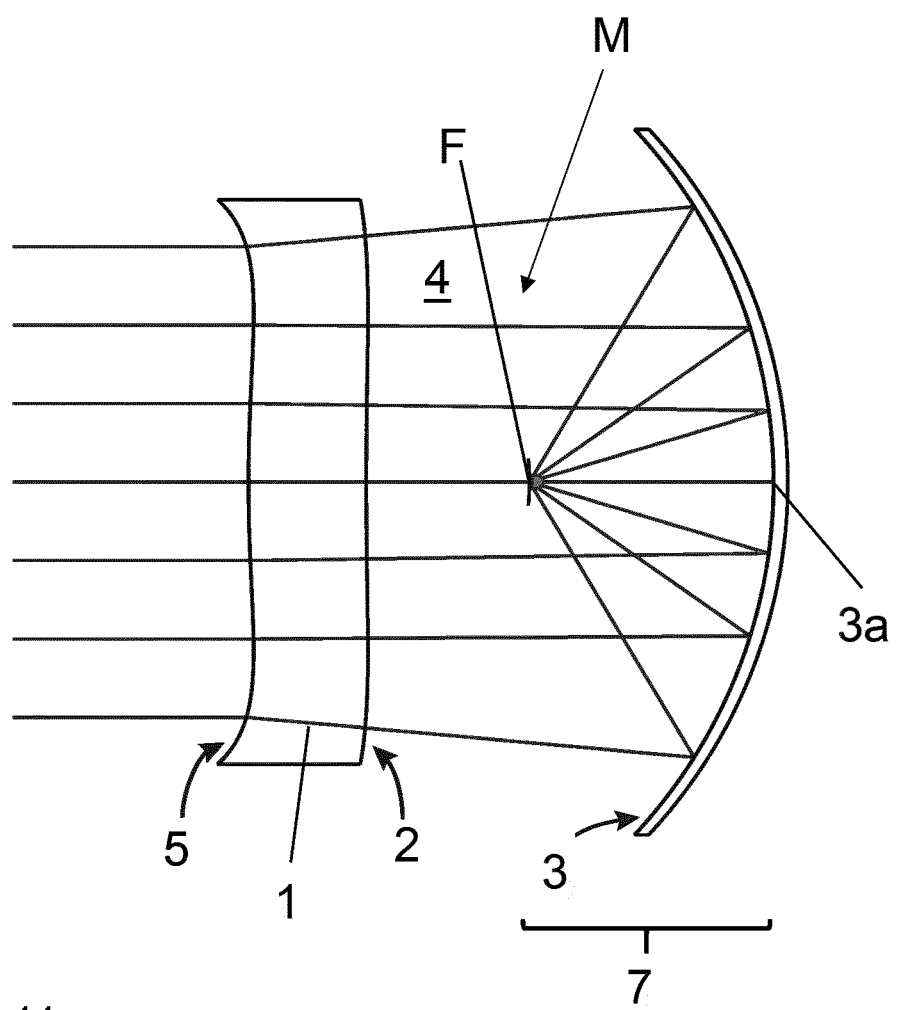
FIG. 11 shows a cross-sectional view of a further embodiment of a multi-immersion microscope objective.
Figure 12A:
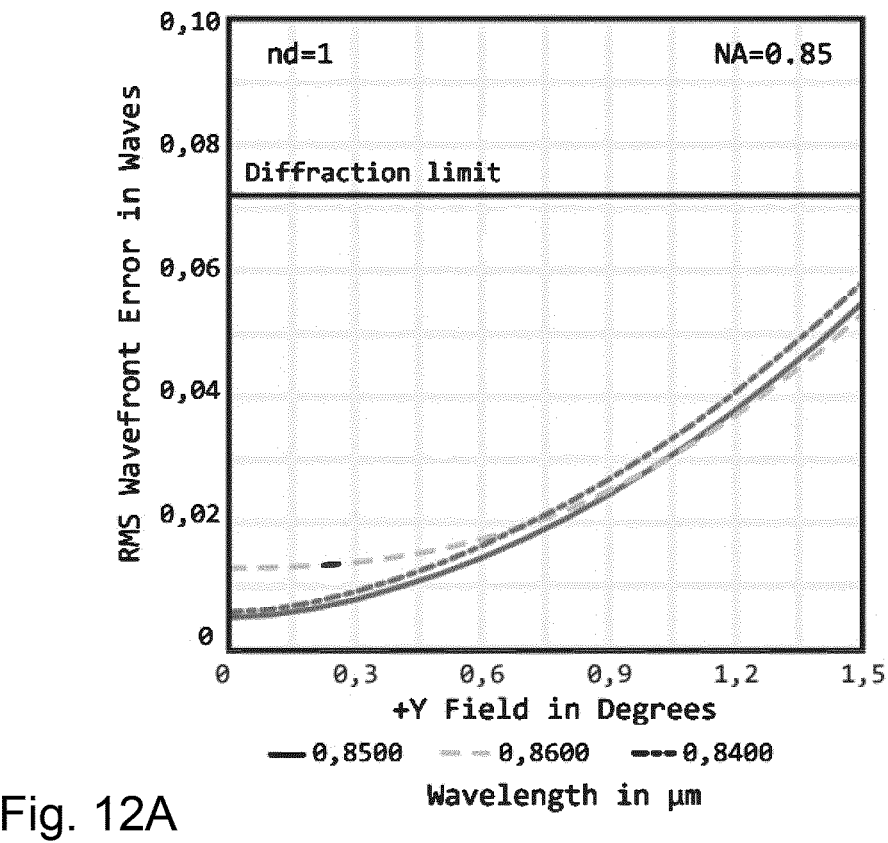
FIGS. 12A-12D show RMS wavefront diagrams for different immersion media and wavelengths for the embodiment shown in FIG. 11.
Figure 12B:
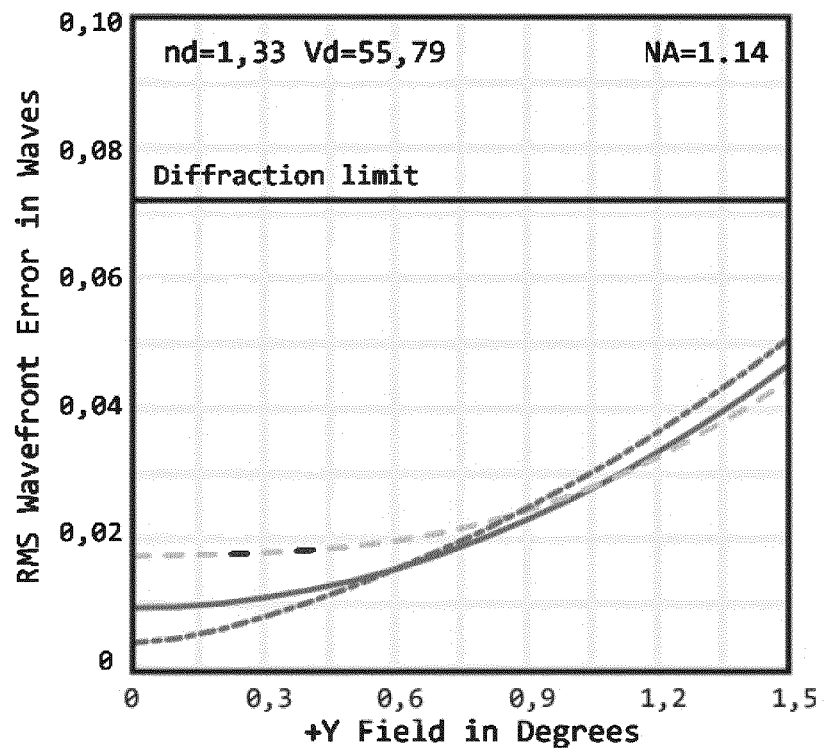
Figure 12:
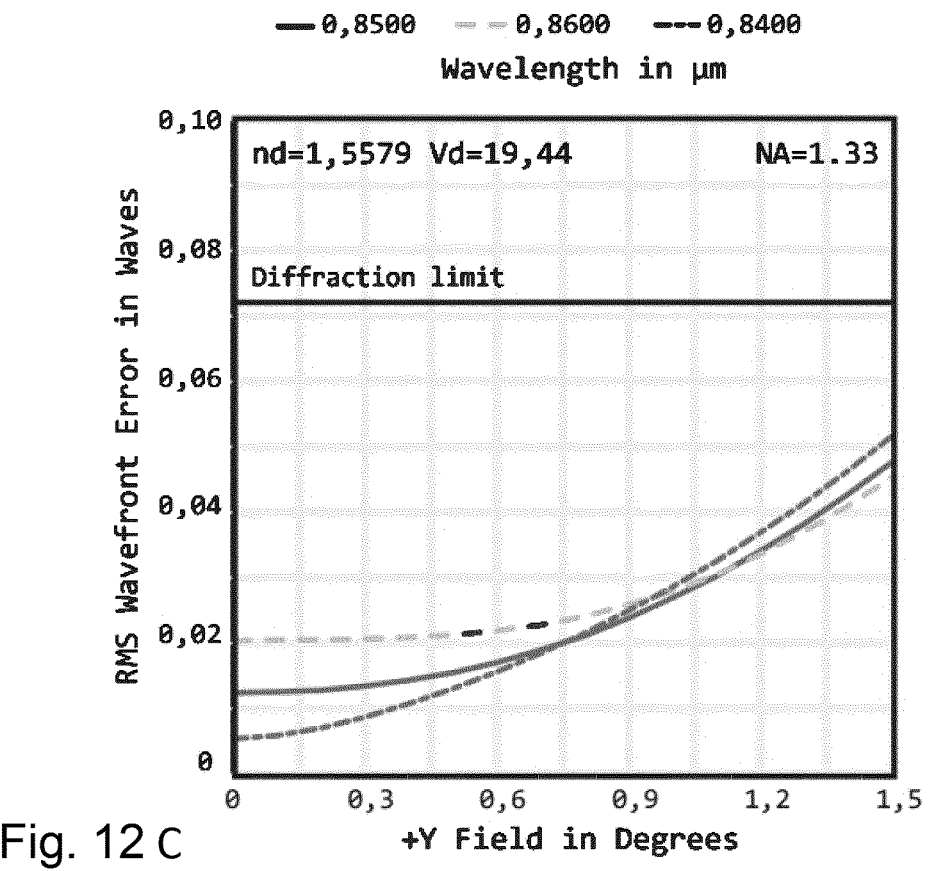
Figure 12D:
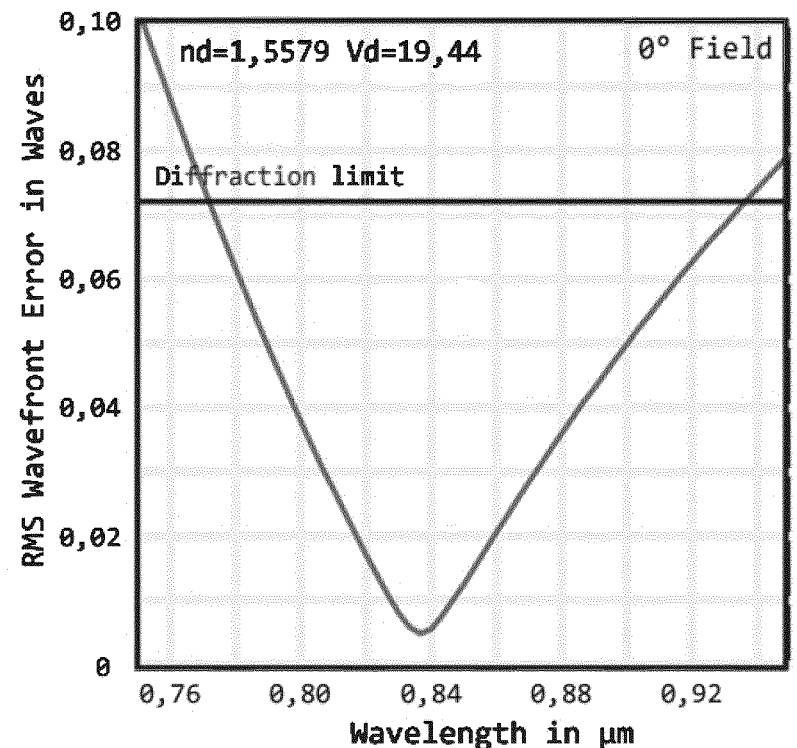

Exemplary parameters that are used in the embodiment according to FIGS. 11 and 12A to 12D are stated in the two tables below:

| Surface no. | Surface according to FIG. 11 | Radius (mm) | Thickness (mm) | $n_d$ | $V_d$ |
|---|---|---|---|---|---|
| 1 | 5 | 85.512 | 5 | 1.4584 | 67.82 |
| 2 | 2 | 517.546 | 17.293 | Variable | Variable |
| 3 | 3 | −22 | −10.366 | Mirror | Mirror |
| Image | Image | −10.834 | | | |

| Surface no. | Surface according to FIG. 11 | a1 | a2 | a3 | a4 | a5 |
|---|---|---|---|---|---|---|
| 1 | 5 | 2.03824E−03 | −5.44201E−05 | −3.59160E−07 | 2.18769E−09 | −1.91200E−11 |
| 2 | 2 | 1.59327E−03 | −2.19531E−05 | −8.94622E−09 | −5.08478E−10 | 1.27801E−12 |
| 3 | 3 | | | | | |
| Image | Image | | | | | |

A further embodiment of the immersion microscope objective according to the present invention is shown in FIGS. 13 and 14A to 14D.

In a material with $n_d$=1 such as air, this embodiment has a NA of 0.53, in a material with $n_d$=1.333 (such as water), the design has an NA of 0.71. In a higher index medium, for example with $n_d$=1.5579, the system has an NA of 0.82.

It can operate as a two-photon microscope objective with excitation wavelengths ranging from 780 to 940 nm and offers sufficient color correction to operate with 20 nm wide wavelength bands. The immersion medium fills the space between surface 2 and the mirror 3. The location of the image is stable in combination with different immersion media ranging from air, fluid, and solid media with variable $n_d$ and $V_d$.

Compared to the previous embodiments, this embodiment specifies surfaces 5 and 2 to be flat (infinite radius). As a result, the condition that the ratio of the polynomials describing surfaces 5 and 2 should be (n−1)/n can be tested explicitly. Here, n is the index of refraction of the correction plate 1 at the center wavelength of the excitation spectrum. In the previous embodiments, such a comparison is only possible if the stated nonzero surface radii are included in the surface polynomial for surfaces 5 and 2.

Figure 13:
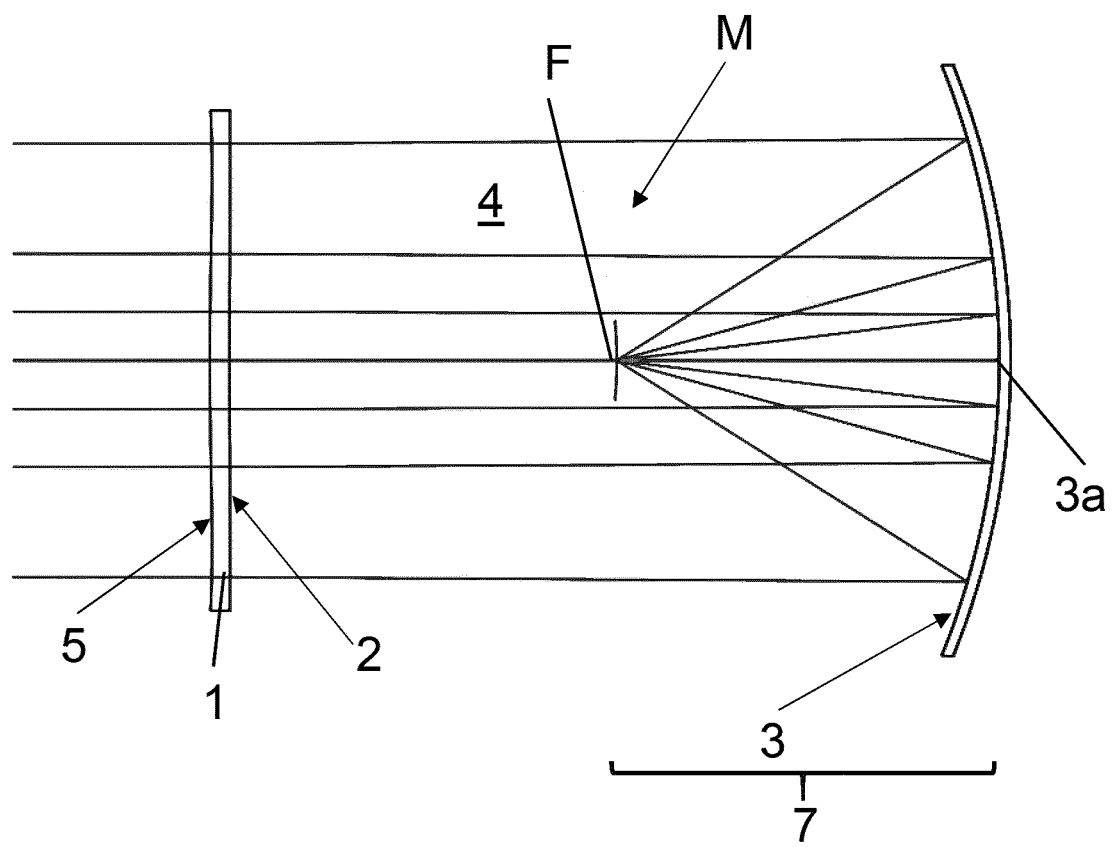
FIG. 13 shows a cross-sectional view of a further embodiment of a multi-immersion microscope objective.
Figure 14A:
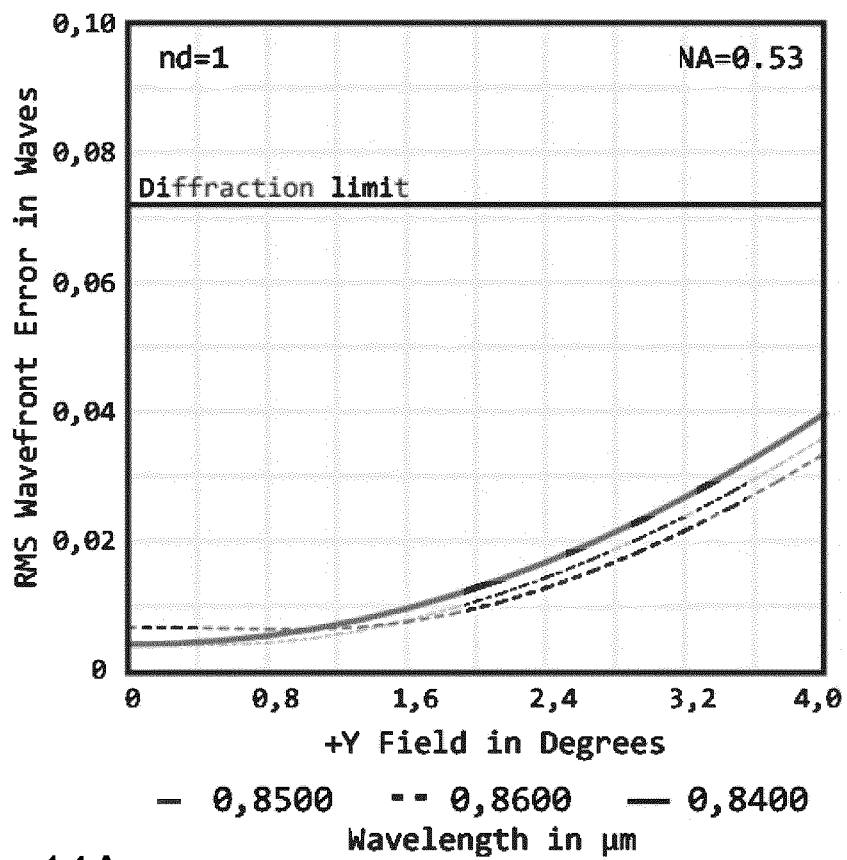
FIGS. 14A-14D show RMS wavefront diagrams for different immersion media and wavelengths for the embodiment shown in FIG. 13.
Figure 14B:
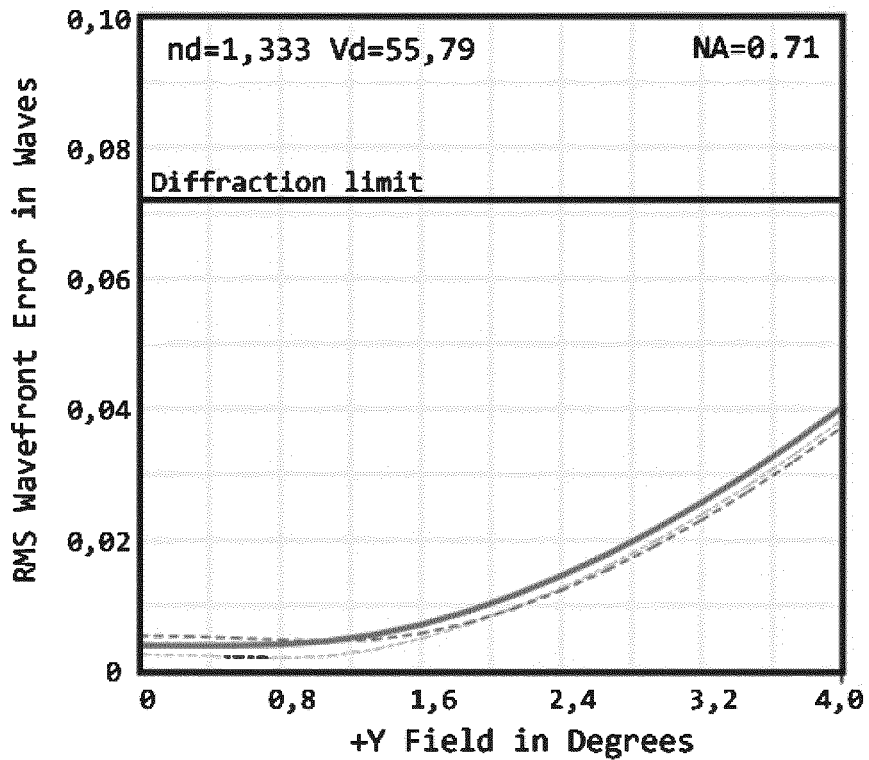
Figure 14C:
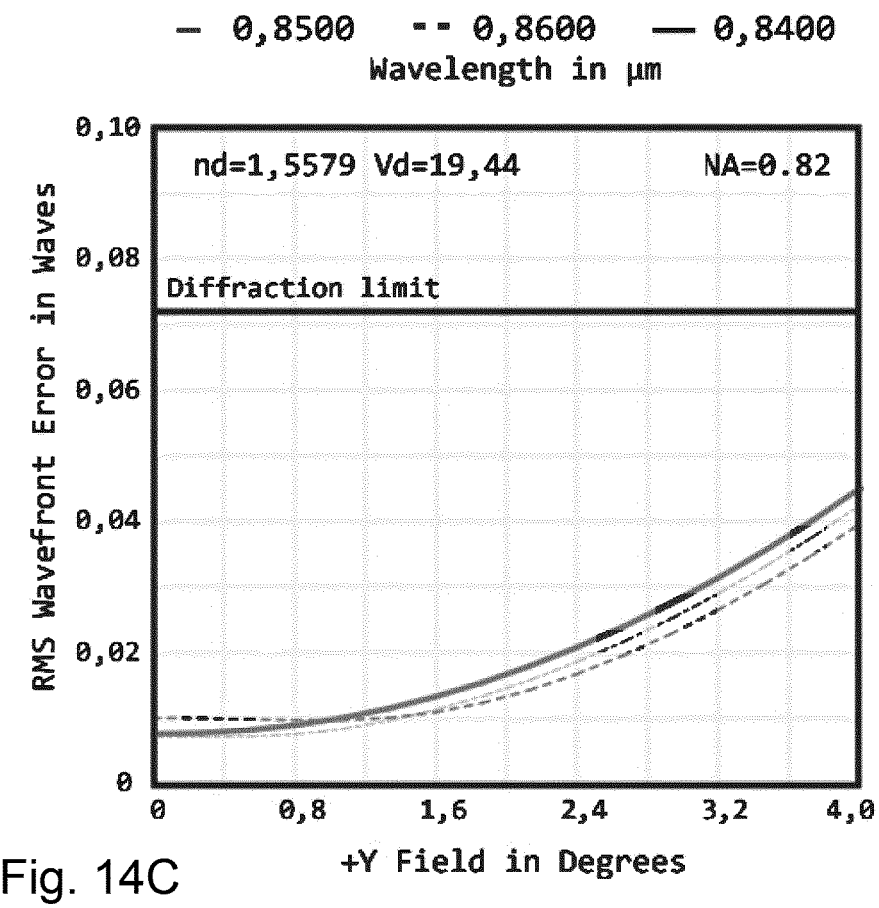
Figure 14D:
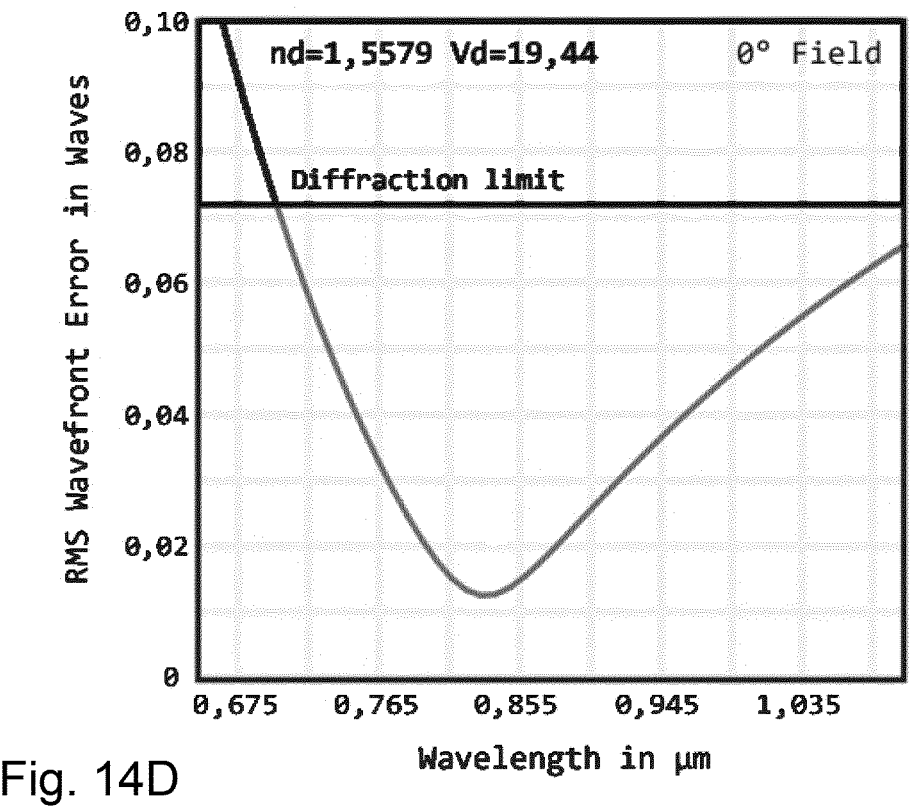

Exemplary parameters that are used in the embodiment according to FIGS. 13 and 14A to 14D are stated in the two tables below:

| Surface no. | Surface according to FIG. 13 | Radius (mm) | Thickness (mm) | $n_d$ | $V_d$ |
|---|---|---|---|---|---|
| 1 | 5 | Infinity | 1 | 1.4584 | 67.82 |
| 2 | 2 | Infinity | 39.068 | Variable | Variable |
| 3 | 3 | −40 | −19.408 | Mirror | Mirror |
| Image | Image | −20.667 | | | |

| Surface no. | Surface according to FIG. 13 | a1 | a2 | a3 |
|---|---|---|---|---|
| 1 | 5 | 2.29856E−03 | −1.08328E−05 | −1.34800E−08 |
| 2 | 2 | 7.17691E−04 | −3.40284E−06 | −4.08693E−09 |
| 3 | 3 | | | |
| Image | Image | | | |

Assuming an index of $n_d$=1.4525 for the correction plate 1 in this embodiment, the ratio between the aspherical coefficients of surface 5 and 2 should be (n−1)/n=0.312 in the paraxial case. The table below shows that this condition is fulfilled in this embodiment:

| Surface | Ideal ratio | a1 | a2 | a3 |
|---|---|---|---|---|
| Ratio of Surface 2 vs. Surface 5 | 0.312 | 0.312 | 0.314 | 0.303 |

BIBLIOGRAPHY

[1] J. Pawley, Ed., Handbook of Biological Confocal Microscopy, 3rd edition. New York, NY: Springer, 2006.
[2] D. S. Richardson and J. W. Lichtman, "Clarifying Tissue Clearing," Cell, vol. 162, no. 2, pp. 246-257, July 2015, doi: 10.1016/j.cell.2015.06.067.
[3] H. Hama et al., "Sca I e: a chemical approach for fluorescence imaging and reconstruction of transparent mouse brain," Nat. Neurosci., vol. 14, no. 11, pp. 1481-1488, November 2011, doi: 10.1038/nn.2928.
[4] A. Ertürk et al., "Three-dimensional imaging of solvent-cleared organs using 3DISCO," Nat. Protoc., vol. 7, no. 11, pp. 1983-1995, November 2012, doi: 10.1038/nprot.2012.119.
[5] N. Renier, Z. Wu, D. J. Simon, J. Yang, P. Ariel, and M. Tessier-Lavigne, "iDISCO: A Simple, Rapid Method to Immunolabel Large Tissue Samples for Volume Imaging," Cell, vol. 159, no. 4, pp. 896-910, November 2014, doi: 10.1016/j.cell.2014.10.010.
[6] R. Cai et al., "Panoptic imaging of transparent mice reveals whole-body neuronal projections and skull-meninges connections," Nat. Neurosci., vol. 22, no. 2, pp. 317-327, February 2019, doi: 10.1038/s41593-018-0301-3.
[7] K. Chung and K. Deisseroth, "CLARITY for mapping the nervous system," Nat. Methods, vol. 10, no. 6, pp. 508-513, June 2013, doi: 10.1038/nmeth.2481.
[8] R. Tomer, L. Ye, B. Hsueh, and K. Deisseroth, "Advanced CLARITY for rapid and high-resolution imaging of intact tissues," Nat. Protoc., vol. 9, no. 7, pp. 1682-1697, July 2014, doi: 10.1038/nprot.2014.123.
[9] E. A. Susaki et al., "Whole-Brain Imaging with Single-Cell Resolution Using Chemical Cocktails and Computational Analysis," Cell, vol. 157, no. 3, pp. 726-739, April 2014, doi: 10.1016/j.cell.2014.03.042.
[10] K. Becker, N. Jahrling, S. Saghafi, R. Weiler, and H.-U. Dodt, "Chemical Clearing and Dehydration of GFP Expressing Mouse Brains," PLOS ONE, vol. 7, no. 3, p. e33916, March 2012, doi: 10.1371/journal.pone.0033916.
[11] B. Yang et al., "Single-Cell Phenotyping within Transparent Intact Tissue through Whole-Body Clearing," Cell, vol. 158, no. 4, pp. 945-958, August 2014, doi: 10.1016/j.cell.2014.07.017.
[12] F. Chen, P. W. Tillberg, and E. S. Boyden, "Expansion microscopy," Science, vol. 347, no. 6221, pp. 543-548, January 2015, doi: 10.1126/science.1260088.
[13] T. Staudt, M. C. Lang, R. Medda, J. Engelhardt, and S. W. Hell, "2,2'-Thiodiethanol: A new water soluble mounting medium for high resolution optical microscopy," Microsc. Res. Tech., vol. 70, no. 1, pp. 1-9, 2007, doi: 10.1002/jemt.20396.
[14] I. Newton, "A letter of Mr. Isaac Newton, Professor of the Mathematicks in the University of Cambridge; containing his new theory about light and colors: sent by the author to the publisher from Cambridge, Feb. 6, 1671/72; in order to be communicated to the R. Society," Philos. Trans. R. Soc. Lond., vol. 6, no. 80, pp. 3075-3087, January 1671, doi: 10.1098/rstl.1671.0072.
[15] B. Schmidt, "Ein lichtstarkes komafreies Spiegelsystem," Mitteilungen Hambg. Sternwarte Bergedorf, vol. 7, pp. 15-17,1938.
[16] D. J. Schroeder: Astronomical Optics, Elsevier, 2012

The invention claimed is:

1. An immersion microscope objective (10) for inspecting a sample(S) in an immersion medium (M), comprising:
at least one concave mirror (3),
at least one optical element (1) comprising an aspherical surface (2) facing the at least one concave mirror (3),
an internal space (4) arranged between the at least one concave mirror (3) and said aspherical surface (2), said internal space (4) being configured to be filled with an immersion medium (M) such that the immersion medium (M) contacts the at least one concave mirror (3) and the aspherical surface (2),
wherein
the immersion microscope objective (10) comprises a working distance (7) being the distance between the focus (F) of the immersion microscope objective (10) and the vertex (3a) of the concave mirror (3), wherein the aspherical surface (2) is non-planar and is shaped such that the working distance (7) of the immersion microscope objective (10) varies by less than 1% when instead of a first immersion medium (M) being arranged in said internal space (4) a second immersion medium (M) resides in the internal space (4) that comprises a refractive index n that is increased or decreased with respect to the refractive index n of the first immersion medium (M) by at least 0.025, and wherein the immersion microscope objective (10) comprises a further aspherical surface (5) shaped to compensate a spherical aberration created by the at least one mirror (3).

2. The immersion microscope objective according to claim 1, wherein the refractive index n of the first immersion medium is in the range from 1.0 to 1.6, particularly 1.3 to 1.6, and/or wherein the refractive index n of the second immersion medium is in the range from 1.0 to 1.6, particularly 1.3 to 1.6.

3. The immersion microscope objective according to claim 1, wherein the numerical aperture NA of the immersion microscope objective (10) is in the range from 0.3 to 1.0 when the immersion medium (M) present in the internal space (4) is air.

4. The immersion microscope objective according to claim 1, wherein the immersion medium (M) is one of: a fluid, a gas, a liquid, a gel, a hydrogel.

5. The immersion microscope objective according to claim 1, wherein the at least one concave mirror (3) and the at least one optical element (1) are rotationally symmetric with respect to an optical axis (A).

6. The immersion microscope objective according to claim 1, wherein the at least one concave mirror (3) comprises a spherical shape.

7. The immersion microscope objective according to claim 1, wherein the at least one concave mirror (3) is one mirror of a plurality of mirrors comprised by the immersion microscope objective (10), wherein each mirror of said plurality of mirrors is configured to contact the immersion medium (M) when the immersion medium (M) resides in said internal space (4).

8. The immersion microscope objective according to claim 1, wherein the further aspherical surface (5) is formed by said at least one optical element (1) and faces away from said aspherical surface (2) that faces the at least one concave mirror (3).

9. The immersion microscope objective according to claim 1, wherein the immersion microscope objective (10) comprises a lens group comprising a plurality of lenses, wherein the first optical element (1) forms a lens of said lens group, and/or wherein the further optical element forms a lens of said lens group.

10. The immersion microscope objective according to claim 1, wherein the aspherical surface (2) is defined by a polynomial equation $a(y)=a_i y^i$ describing the aspherical surface (2), and wherein the further aspherical surface (5) is defined by a polynomial equation $b(y)=a_i y^i$ describing the further aspherical surface (5), and wherein said polynomial equations a(y) and b(y) obey the relation $a(y)=((n-1)/n) \cdot b(y)$ with n being the refractive index of the optical element (1) at an operating wavelength of the immersion microscope objective.

11. The immersion microscope objective according to claim 1, wherein the further aspherical surface is formed by a further optical element of the immersion microscope objective (10).

12. The immersion microscope objective according to claim 11, wherein the immersion microscope objective (10) comprises a lens group comprising a plurality of lenses, wherein the first optical element (1) forms a lens of said lens group, and/or wherein the further optical element forms a lens of said lens group.

13. The immersion microscope objective according to claim 1, wherein the immersion microscope objective (10) comprises a sample holder (6) configured to hold a sample (S) such that the sample(S) is located in said internal space (4) between the at least one concave mirror (3) and said aspherical surface (2) facing the at least one concave mirror (3).

14. A microscope (100) comprising an immersion microscope objective (10) according to claim 1.

15. The microscope according to claim 14, wherein the microscope (100) is one of:

a wide-field microscope, particularly comprising a single- or a multi-element tube lens,
a light-sheet microscope, particularly comprising a single- or a multi-element tube lens,
a two-photon fluorescence microscope,
a three-photon fluorescence microscope,
a four-photon fluorescence microscopy,
a second-harmonic generation microscope,
a third-harmonic generation microscope,
a fluorescence confocal microscope,
a reflectance confocal microscope,
a polarization microscope,
a Coherent Anti-Stokes Raman Scattering (CARS) microscope,
a stimulated Raman Scattering (SRS) microscope.

16. The immersion microscope objective according to claim 1, wherein the aspherical surface (2) is defined by a polynomial equation $a(y)=a_i y^i$ describing the aspherical surface (2), and wherein the further aspherical surface (5) is defined by a polynomial equation $b(y)=a_i y^i$ describing the further aspherical surface (5), and wherein said polynomial equations $a(y)$ and $b(y)$ obey the relation $a(y)=((n-1)/n)\cdot b(y)$ with n being the refractive index of the optical element (1) at an operating wavelength of the immersion microscope objective.

17. An immersion microscope objective (10) for inspecting a sample(S) in an immersion medium (M), comprising:
at least one concave mirror (3),
at least one optical element (1) comprising an aspherical surface (2) facing the at least one concave mirror (3),
an internal space (4) arranged between the at least one concave mirror (3) and said aspherical surface (2), said internal space (4) being configured to be filled with an immersion medium (M) such that the immersion medium (M) contacts the at least one concave mirror (3) and the aspherical surface (2),
wherein
the immersion microscope objective (10) comprises a working distance (7) being the distance between the focus (F) of the immersion microscope objective (10) and the vertex (3a) of the concave mirror (3), wherein the aspherical surface (2) is non-planar and is shaped such that the working distance (7) of the immersion microscope objective (10) varies by less than 1% when instead of a first immersion medium (M) being arranged in said internal space (4) a second immersion medium (M) resides in the internal space (4) that comprises a refractive index n that is increased or decreased with respect to the refractive index n of the first immersion medium (M) by at least 0.025, wherein the at least one concave mirror (3) is one mirror of a plurality of mirrors comprised by the immersion microscope objective (10), wherein each mirror of said plurality of mirrors is configured to contact the immersion medium (M) when the immersion medium (M) resides in said internal space (4).

* * * * *